United States Patent Office 3,207,697
Patented Sept. 21, 1965

3,207,697
HIGH-TEMPERATURE NUCLEAR FUEL STRUCTURES AND THEIR PRODUCTION
Friedrich Benesovsky and Erwin Rudy, Reutte, Tirol, Austria, assignors, by mesne assignments, to United Kingdom Atomic Energy Authority, London, England
No Drawing. Filed Mar. 14, 1962, Ser. No. 180,408
6 Claims. (Cl. 252—301.1)

In high temperature and breeder reactors, natural and enriched uranium and thorium are used as fuel. These may be inserted in compact form or as a dispersion. In most cases, graphite is used for taking up the fuel and as a moderator; noble gases, in particular helium, are used as coolants and for heat transference. In order to obtain a high thermal efficiency, working temperatures are sought which are as high as possible (800–1800° C.). At these temperatures, uranium and thorium react with carbon to produce carbides which cause undesirable changes in the fuel element.

The formation of carbides during the operation may be avoided if carbides of the aforementioned metals are used as fuel from the very beginning. This obvious solution, however, comes up against the difficulty that both uranium carbide and thorium carbide react rather rapidly at high temperatures with the surrounding graphite to form the following carbon compounds: $U_2C_3$, $UC_2$ or $ThC_2$. The dicarbides may no longer react with the graphite but they are very brittle and at high temperatures (1800° C.) they undergo various modifications in size and release carbons which are dependent on the temperature. Moreover, thorium carbides are unstable in the atmosphere and rapidly change to oxides, particularly under humid conditions. It is therefore of the greatest technical importance to find stabilisers for uranium monocarbide which make this nuclear fuel for high temperature reactors resistance to the high operational temperatures, i.e. one which prevents the formation of dicarbides.

Basically, only metals may be considered for this purpose which form monocarbides at the most and which may be very consistently mixed with UC. The metal constituents should not have a high neutron absorption cross-section.

The consistent miscibility of UC with ZrC, NbC and TaC is already known from earlier studies, TiC and VC form only limited mixed crystals because of the great difference in the lattice constant, and in the case of HfC a gap in the range of miscibility remains in spite of the appropriate elementary cell size and at temperature around 2000° C. The carbides of chromium, molybdenum and tungsten form ternary intermetallic compounds with UC. ZrC and NbC are those of the aforementioned carbides which are particularly concerned from the point of view of nuclear physics. In the published art relating to the U–Zr–C and U–Nb–C systems, it is stated that the pseudo-binary mixed crystals UC–ZrC and UC–NbC change into mixtures of $UC_2$+MeC+C (Me=Zr, Nb) in the presence of carbon at temperatures above 1000° C., so that there is therefore no region within which these monocarbide crystals are stable in the presence of carbon. Surprisingly enough, however, this is not the case.

Accordingly therefore the invention consists in a high temperature material for use as fuel elements or constructional parts in nuclear technology, comprising firstly, from 0.5 to 30 mol percent uranium monocarbide (UC), secondly, zirconium carbide (ZrC) and/or niobium carbide (NbC), and thirdly, carbon (as graphite, from 0.5 to 99.5 percent by weight), said material forming no uranium dicarbide ($UC_2$) when heated to temperatures above 800° C. The material may also contain from 0.5 to 2 mol percent thorium.

Regions have been found in both the UC–ZrC and the UC–NbC series, in which the mixed crystals are stable in the presence of carbon up to the highest temperatures and do not reduce to $UC_2$+MeC+C. These limits may be determined by X-ray. For a temperature of 1400° C., they are approximately 30 mol. percent UC (in the UC–ZrC system), 25 mol. percent UC (in the UC–NbC system) and 30 mol. percent UC (in the UC–ZrC–NbC system). At higher temperatures the limits change to higher UC contents.

For manufacturing the materials, the invention provides a method according to which the pre-constituted monocarbides are mixed in suitable proportions, compressed and heated to a temperature of from 1800 to 2000° C. for forming a mixed crystal, cooled and reduced in size, after which a suitable quantity of graphite powder is mixed in. The mixture may be pressed to form a shaped article at a pressure of 2–7 t./cm.$^2$. The shaped articles may be inserted into the fuel containers whether or not they undergo any subsequent treatment.

If desired, the appropriate amounts of uranium, zirconium and/or niobium powder (or hydride powder) are mixed with carbon, the mixture is hot-pressed and the resultant pressing is annealed at from 1800 to 2000° C. for from 2 to 4 hours in a protective gas atmosphere, e.g. of hydrogen or argon, or in a vacuum, in order to attain the total homogenisation of the mixed crystal. It is then reduced in size once more and, mixed with the appropriate amount of graphite powder, is pressed into shaped articles or parts. Natural and/or enriched uranium may be used as the initial powder for the uranium carbide components.

It has proved advantageous to introduce the carbon in the form of a coating on the powder particles of the suitable carbide mixed crystals in order to restrict fission products during operation. The known vorticity bed process has proved satisfactory in this respect, by means of which the particles are whirled around in a vessel by a hot gas current of an inert gas and a hydrocarbon and are simultaneously coated with a dense, very adhesive carbon layer of the desired strength, as a result of the decomposition of the hydrocarbon.

What we claim is:
1. A high temperature material characterized by its high stability and resistance to reduction in a carbon rich environment consisting essentially of a monocarbide of at least one nuclear fuel metal carbide, a metal carbide, and carbon, said carbide of a nuclear fuel metal and said metal carbide being present in proportions such that the nuclear fuel metal carbide content of the pseudo binary mixed crystals is 0.5–30 mol percent and the metal carbide is selected from the group consisting of zirconium carbide, niobium carbide, and mixtures thereof.
2. A high temperature material as claimed in claim 1 in which the carbide components contain from 0.5 to 2 mol percent of thorium carbide.
3. A high temperature material characterized by its high stability and resistance to reduction in a carbon rich environment consisting essentially of uranium monocarbide, a metal carbide, and carbon, wherein the uranium monocarbide content of the pseudo binary mixed crystals is 0.5–30 mol percent and the metal carbide is selected from the group consisting of zirconium carbide, niobium carbide, and mixtures thereof.
4. A high temperature material characterized by its high stability and resistance to reduction in a carbon rich environment comprising uranium monocarbide and niobium carbide wherein the uranium carbide content of the pseudo binary mixed crystals is 0.5–30 mol percent.
5. A high temperature material as claimed in claim 3 in which the carbon content is in the form of powdered graphite and constitutes from 0.5 to 99.5% by weight of the material, the remaining constituents being uranium carbide and a carbide of a metal selected from the group consisting of niobium, zirconium, and mixtures thereof.

6. A high temperature material as claimed in claim 5 wherein at least a proportion of the carbon is present in the material in the form of an outer coating overlying mixed crystals of the remaining constituents.

References Cited by the Examiner

UNITED STATES PATENTS

| | | | |
|---|---|---|---|
| 2,244,052 | 6/41 | Comstock | 75—204 |
| 2,526,805 | 10/50 | Carter et al. | 75—204 |
| 2,920,024 | 1/60 | Barton et al. | 252—301.1 |
| 3,011,960 | 12/61 | Williams et al. | 264—21 |
| 3,031,389 | 4/62 | Goeddel et al. | |
| 3,044,946 | 7/62 | Litton | 252—301.1 |
| 3,081,249 | 3/63 | Whittemore | 264—21 |
| 3,088,892 | 5/63 | Cain et al. | 176—69 |
| 3,121,047 | 2/64 | Stoughton et al. | 176—69 |

OTHER REFERENCES

Benesovsky et al.: Information on the System Uranium-Zirconium-Carbon (Metallwerk Plansee A.G., Reutte, Tirol, Austria), Planseeber. Pulvermet. 9: 65–76 (April 1961) (in German).

AEC Document, LA–2159, July 1958, pp. 7–12.

Nuclear Fuel Elements by Hausner et al., November 1959, pp. 197–202 and 208.

2nd Geneva Conference on Atomic Energy, vol. 6, pp. 543–549, September 1958.

Power Reactor Technology, vol. 4, No. 1, December 1960, pp. 48–52.

Nowotny et al.: Monatshefte für Chemie, vol. 88, No. 3, pp. 336–343, June 15, 1957.

CARL D. QUARFORTH, *Primary Examiner.*

REUBEN EPSTEIN, OSCAR R. VERTIZ, *Examiners.*